US012030719B2

(12) United States Patent
Jeon

(10) Patent No.: US 12,030,719 B2
(45) Date of Patent: Jul. 9, 2024

(54) MULTI-LAYERED CIRCULATION TYPE PART FEEDING APPARATUS

(71) Applicant: BRILS Co., Ltd., Incheon (KR)

(72) Inventor: Jin Jeon, Incheon (KR)

(73) Assignee: BRILS Co., Ltd., Incheon (KR)

( * ) Notice: Subject to any disclaimer, the term of this patent is extended or adjusted under 35 U.S.C. 154(b) by 0 days.

(21) Appl. No.: 18/502,641

(22) Filed: Nov. 6, 2023

(65) Prior Publication Data

US 2024/0190654 A1    Jun. 13, 2024

(30) Foreign Application Priority Data

Dec. 12, 2022    (KR) .................. 10-2022-0172339

(51) Int. Cl.
*G06F 7/00* (2006.01)
*B23Q 5/22* (2006.01)
*B65G 1/02* (2006.01)
*B65G 1/137* (2006.01)
*B65G 43/08* (2006.01)

(52) U.S. Cl.
CPC .............. *B65G 1/137* (2013.01); *B23Q 5/22* (2013.01); *B65G 1/026* (2013.01); *B65G 43/08* (2013.01); *B65G 2203/0241* (2013.01); *B65G 2203/0258* (2013.01); *B65G 2203/0283* (2013.01); *B65G 2203/041* (2013.01); *B65G 2814/0302* (2013.01); *B65G 2814/0344* (2013.01)

(58) Field of Classification Search
CPC .................................. B65G 1/137; B23Q 5/28
USPC ......................................... 700/213, 218, 228
See application file for complete search history.

(56) References Cited

U.S. PATENT DOCUMENTS

| 4,237,598 A | * | 12/1980 | Williamson | ....... G05B 19/4189 |
| | | | | 29/563 |
| 2022/0297937 A1 | * | 9/2022 | Velagapudi | .......... B65G 1/0471 |
| 2023/0109294 A1 | * | 4/2023 | Kim | ........................ B25J 13/06 |
| | | | | 700/253 |
| 2023/0130332 A1 | * | 4/2023 | Swindells | ............ G06Q 10/087 |
| | | | | 705/28 |

FOREIGN PATENT DOCUMENTS

| JP | 06059579 B2 | 8/1994 |
| JP | 2020-095720 A | 6/2020 |
| KR | 10-1407916 B1 | 6/2014 |
| KR | 10-1859229 B1 | 5/2018 |
| KR | 10-2014116 B1 | 8/2019 |

\* cited by examiner

*Primary Examiner* — Yolanda R Cumbess
(74) *Attorney, Agent, or Firm* — Bridgeway IP Law Group, PLLC; Jihun Kim

(57) ABSTRACT

A parts feeding apparatus includes: a parts feeder disposed on one side of a worktable where work is performed and having a plurality of feeder slots each for loading at least one parts box; a position mover adapted to load the parts boxes onto the parts feeder or unload the parts boxes loaded on the plurality of slots to move the parts boxes horizontally or vertically; a parts storage unit located to face the parts feeder and having a plurality of storage unit slots for loading at least one or more parts boxes to store the parts boxes to be fed to the parts feeder therein; and a control unit adapted to control the parts feeder and the position mover so that the parts boxes are changed in position and aligned.

8 Claims, 12 Drawing Sheets

MULTI-LAYERED CIRCULATION TYPE PART FEEDING APPARATUS

BACKGROUND OF THE DISCLOSURE

Cross Reference to Related Application of the Disclosure

The present application claims the benefit of Korean Patent Application No. 10-2022-0172339 filed in the Korean Intellectual Property Office on Dec. 12, 2022 the entire contents of which are incorporated herein by reference.

FIELD OF THE DISCLOSURE

The present disclosure relates to a parts feeding apparatus, more specifically to a parts feeding apparatus that is capable of storing parts needed for work and alignedly feeding the stored parts according to the order of the work.

BACKGROUND OF THE RELATED ART

Augmented Reality (AR) is a technology that overlays a virtual image onto a portion of a real world image. Virtual Reality (VR) is an environment where a user's body, background and foreground are virtual images, but the augmented reality is different from the virtual reality in that some of the user's body, background and foreground are real-world images.

Further, a smart factory is an intelligent factory that applies Information and Communications Technology (ICT), combined with digital automation solutions, to production processes. These processes include design, development, manufacturing, and distribution to improve productivity, quality, and customer satisfaction[[ ]]. Accordingly, the smart factory is a future-type factory that installs Internet of Things (IoT) on equipment and machines built therein, collects process data in real time, and analyzes the process data to allow the equipment and machines to be controlled for themselves.

Further, the smart factory in an industrial field of machine parts is a labor-intensive facility for assembling and inspecting raw materials or parts, and accordingly, processes of fitting, coupling, and inspecting the materials and parts are important. Further, process data occurring during the fitting and coupling and inspection data collected during the inspection are connected to each other so that quality analysis should be performed.

Accordingly, endeavors for the automation of entire process of the smart factory in the industrial field of machine parts have been made, but in the case of a manual process with a high degree of difficulty, even until now, the manual process has to be performed only with a worker's hands because of their importance and difficulty in process.

Such a manual process with the high degree of difficulty absolutely needs a large number of skilled workers, but the usability of the skilled workers is substantially lowered due to the difficulty in process, the lack of labor supply, worker aging, etc.

Therefore, there is a need to provide work guide, recording order, a work operation sheet, and the like to an unskilled person during his or her manual process so that the adaptation to the manual process of the unskilled person is enhanced to optimize quality preservation and labor utilization.

PRIOR ART LITERATURE

Patent Literature (Patent literature 1) Korean Patent No. 10-1407916 entitled 'Apparatus for parts supply in assembly line and method thereof' (Issued on Jun. 17, 2014)

(Patent literature 2) Korean Patent No. 10-1859229 entitled 'Apparatus and method for displaying operation guide information of construction equipment' (Issued on May 17, 2018)

SUMMARY OF THE DISCLOSURE

Accordingly, the present disclosure has been made in view of the above-mentioned problems occurring in the related art, and it is an object of the present disclosure to provide a parts feeding apparatus that is capable of storing parts needed for work and alignedly feeding the stored parts according to the order of the work.

To accomplish the above-mentioned objects, according to one aspect of the present disclosure, there is provided a parts feeding apparatus that may include: a parts feeder disposed on one side of a worktable and configured to feed parts to the worktable where work is performed and having a plurality of unit slots each for loading at least one parts box to allow at least one of the part boxes loaded onto the slots to be aligned according to the order of work and fed to the worktable; a parts storage unit disposed to face the parts feeder, the parts storage having a plurality of storage unit slots configured to be loaded with at least one parts box; a position mover disposed between the parts feeder and the parts storage unit, the position mover being configured to load the parts boxes from the plurality of storage unit slots onto the plurality of unit slots, or to load the at least one parts box from the plurality of unit slots onto the plurality of storage unit slots, wherein the position mover is configured to move the parts boxes horizontally or vertically according to an order of work; and a control unit adapted to control the parts feeder to feed the parts to the worktable according to the order of work and to control the position mover to load the parts boxes onto the parts feeder from the parts storage, and to load the at least one parts box onto the parts storage from the parts feeder or to allow the part boxes loaded on the parts feeder to be unloaded according to the order of work in such a way as to move the unloaded parts boxes horizontally and vertically so that the parts boxes are changed in position and aligned, wherein the parts feeder may include: a frame having a plurality of spaces; and a plurality of unit slots, each being disposed in each of the plurality of spaces in a vertical direction, wherein each of the plurality of unit slots may include: a movable slot disposed on the lowermost end of each of the plurality of spaces and configured to receive the parts box according to the order of work; and a plurality of fixed slots vertically disposed above the movable slot, and wherein the movable slot may include: a slot body fixedly disposed to the corresponding space formed on the frame; a movable slot body configured to receive the parts box thereon according to the order of work, the movable slot body being configured to move forward or backward in a longitudinal direction of the slot body to feed the parts from the parts boxes to the worktable according to the order of work; and slot guide bars disposed on the slot body to guide the forward or backward movement of the movable slot body.

According to the present disclosure, desirably, the position mover may include: a vertical mover configured to vertically move the parts boxes in a direction of the plurality of unit slots; a horizontal mover coupled to the vertical mover to move the parts boxes along a horizontal direction of the plurality of unit slots; and a grasper coupled to the horizontal mover to move horizontally, the grasper being configured to move forward or backward in a state of grasping the parts box to load or unload the corresponding parts box onto or from the parts feeder or the parts storage unit.

According to the present disclosure, desirably, the vertical mover may include: a first body having a given length in the direction of the plurality of unit slots; first guide bars having given lengths along the first body to guide the vertical movements of the parts boxes; and a first driver configured to move the horizontal mover along the first guide bars.

According to the present disclosure, desirably, the horizontal mover may include: a second body having a given length in the direction vertical to the first body in such a way as to be slidably coupled to the first guide bars to move along the first guide bars by means of the first driver; second guide bars having given lengths along the second body to guide the horizontal movements of the parts boxes; and a second driver adapted to move the grasper along the second guide bars.

According to the present disclosure, desirably, the grasper may include: a third body having a given length in the direction vertical to the second body in such a way as to be slidably coupled to the second guide bars to move along the second guide bars by means of the second driver; third guide bars having given lengths along the third body to guide the forward or backward movement of the parts box; and a gripper adapted to move forward or backward along the third guide bars toward the parts feeder or the parts storage unit in a state of grasping the parts box so that the parts box is loaded or unloaded onto or from the parts feeder or the parts storage unit.

According to the present disclosure, desirably, the position mover may further include a camera adapted to capture an image of the interior of the parts box grasped by the gripper, and the gripper may further include a weight sensor for measuring the weight of the parts box grasped, so that the control unit may identify the types of parts disposed in the parts box grasped through the captured image by the camera and calculate the number of parts disposed in the grasped parts box according to the unit weights of the identified parts and the weight of the grasped parts box measured by the weight sensor.

According to the present disclosure, desirably, if the number of parts calculated is smaller than the number of parts required for the work being performed by the worker, the control unit may load the grasped parts box onto the empty slot of the parts storage unit and allow the parts box having the same types of parts as disposed in the parts storage unit to be grasped and fed to the parts feeder.

According to the present disclosure, desirably, the parts storage unit may further include output devices adapted to output the number of parts remaining included in the loaded parts boxes, so that the control unit controls the position mover to allow the parts box with which the work has been completed to be unloaded from the parts feeder and then calculates the number of parts remaining included in the parts box with which the work has been completed to load the parts box with which the work has been completed onto the parts storage unit, and simultaneously, the control unit outputs the number of parts calculated as well as the identification information corresponding to the types of parts identified to the output devices.

BRIEF DESCRIPTION OF THE DRAWINGS

The above and other objects, features and advantages of the present disclosure will be apparent from the following detailed description of the preferred embodiments of the disclosure in conjunction with the accompanying drawings, in which.

DETAILED DESCRIPTION OF THE PREFERRED EMBODIMENTS

Figure 1:
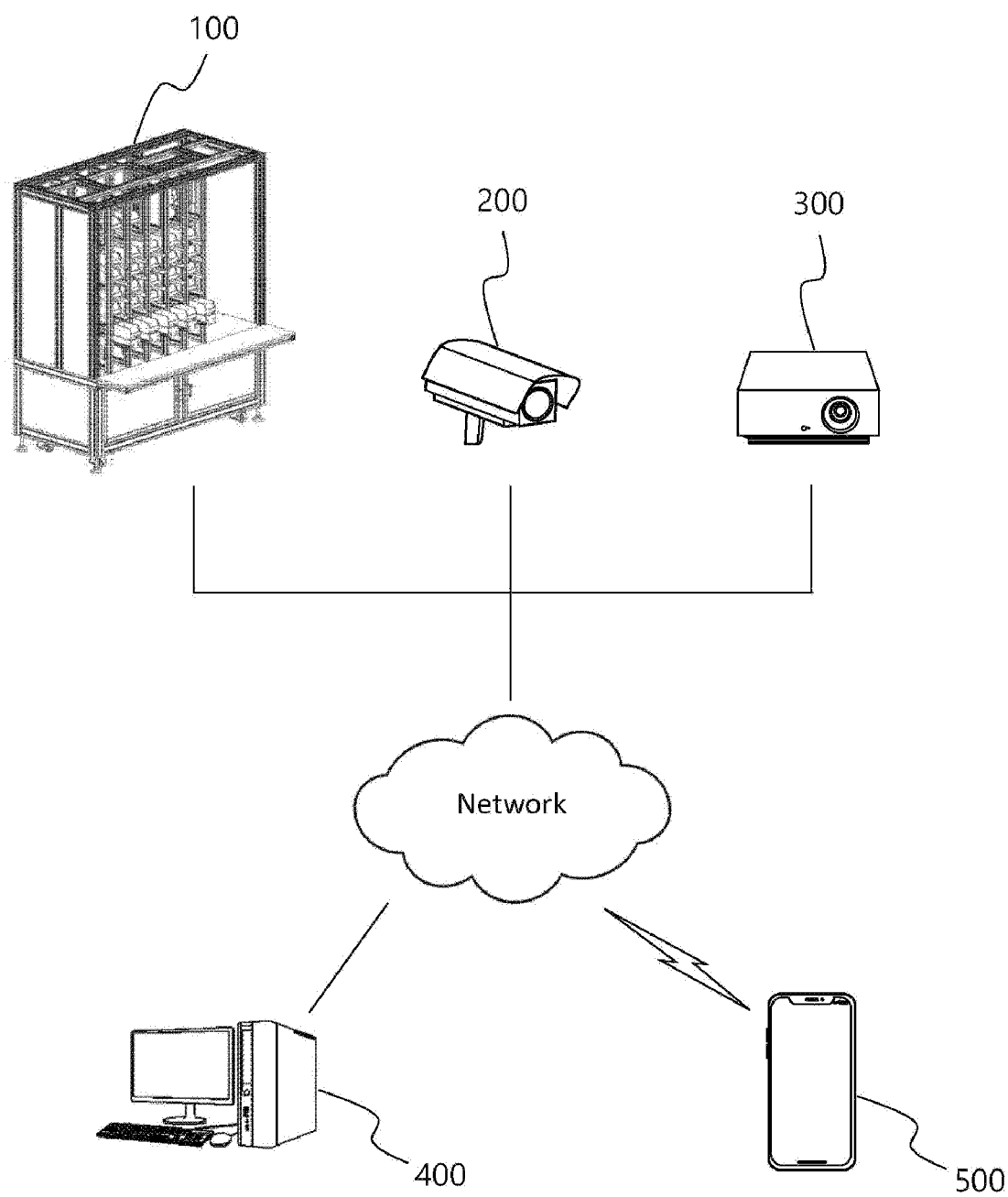
FIG. 1 is a block diagram showing a work system according to the present disclosure.

Terms used in this application are used to only describe specific exemplary embodiments and are not intended to restrict the present disclosure. All terms used herein, including technical or scientific terms, unless otherwise defined, have the same meanings which are typically understood by those having ordinary skill in the art. The terms, such as ones defined in common dictionaries, should be interpreted as having the same meanings as terms in the context of pertinent technology, and should not be interpreted as having ideal or excessively formal meanings unless clearly defined in the specification.

An expression referencing a singular value additionally refers to a corresponding expression of the plural number, unless explicitly limited otherwise by the context. In the entire specification, when a certain portion "comprises and/or includes" a certain component, this indicates that the other components are not excluded and may be further included unless specially described otherwise.

Terms, such as the first, the second, and the like, may be used to describe various elements, but the elements should not be restricted by the terms. The terms are used to only distinguish one element from the other element. For example, a first element may be named a second element without departing from the scope of the present disclosure. Likewise, a second element may be named a first element.

When it is said that one element is described as being "connected" or "coupled" to the other element, one element may be directly connected or coupled to the other element, but it should be understood that another element may be present between the two elements. In contrast, when it is said that one element is described as being "directly connected" or "directly coupled" to the other element, it should be understood that another element is not present between the two elements.

The present disclosure is disclosed with reference to the attached drawings wherein the corresponding parts in the embodiments of the present disclosure are indicated by corresponding reference numerals and the repeated explanation on the corresponding parts will be avoided. If it is determined that the detailed explanation on the well known technology related to the present disclosure makes the scope of the present disclosure not clear, the explanation will be avoided for the brevity of the description. The present disclosure may be modified in various ways and may have several exemplary embodiments. Specific exemplary embodiments of the present disclosure are illustrated in the drawings and described in detail in the detailed description. However, this does not limit the disclosure within specific embodiments and it should be understood that the disclosure covers all the modifications, equivalents, and replacements within the idea and technical scope of the disclosure.

Further, the smart factory in an industrial field of machine parts is a labor-intensive facility for assembling and inspecting raw materials or parts, and accordingly, processes of fitting, coupling, and inspecting the materials and parts are important. Further, process data occurring during the fitting and coupling and inspection data collected during the inspection are connected to each other so that quality analysis should be performed.

Accordingly, endeavors for the automation of entire process of the smart factory in the industrial field of machine parts have been made, but in the case of a manual process with a high degree of difficulty, even until now, the manual process has to be performed only with a worker's hands because of their importance and difficulty in process.

Such a manual process with the high degree of difficulty absolutely needs a large number of skilled workers, but the usability of the skilled workers is substantially lowered due to the difficulty in process, the lack of labor supply, worker aging, etc.

Therefore, there is a need to provide work guide, recording order, a work operation sheet, and the like to an unskilled person during his or her manual process so that the adaptation to the manual process of the unskilled person is enhanced to optimize quality preservation and labor utilization.

To solve such limitations, the present disclosure proposes various means for optimizing quality preservation and labor utilization.

FIG. 1 is a block diagram showing a work system according to the present disclosure.

Referring to FIG. 1, a work system according to the present disclosure includes a parts feeding apparatus 100, a camera 200, a projector 300, a management server 400, and a manager terminal 500.

The components of the work system according to the present disclosure are just components that are functionally distinguished from one another. Therefore, two or more components may be physically integrated with one another in a real-world physical environment, [[ ]] or otherwise, one component may be separated from other components in the real-world physical environment.

Explanations of the respective components of the work system according to the present disclosure will be given below. First, the parts feeding apparatus 100 is disposed on one side of a worktable where work is performed by a worker. The parts feeding apparatus has a parts storage unit configured to store parts to be needed for the work, a position mover configured to align the stored parts according to the order of work, and the parts feeder configured to feed the aligned parts to the worker.

In one embodiment, [[ ]] the parts feeding apparatus 100 is made integrally with the worktable in such a way that the parts feeding apparatus 100 may face the worker, and the worktable is located between the worker and the parts feeding apparatus 100. In another embodiment, the parts feeding apparatus 100 may be provided separately from the worktable. In this case, the parts feeding apparatus 100 may be located on one side of the worktable which is located in front of a worker. The parts feeding apparatus 100 faces the worker so that [[ ]] the parts feeding apparatus 100 feeds the parts toward worktable in front of the worker.

In detail, the parts feeding apparatus 100 individually unloads multi-layered loaded parts boxes and moves the unloaded parts boxes vertically or horizontally. Further, the parts feeding apparatus 100 aligns the parts boxes according to the order of work, allows the aligned parts boxes to slidingly protrude therefrom toward the worktable, and feeds the protruding parts boxes to the worker.

If the work has been completed, the parts feeding apparatus 100 allows the parts boxes slidingly protruding therefrom to move back so that the parts boxes are returned to their original position.

Like this, the parts feeding apparatus 100 serves to store the parts to be needed for work, align the stored parts according to the order of work, and feed the aligned parts to the worker, so that it is possible to perform fast handling when the work is changed and the parts are prevented from being erroneously used.

Further, a configuration of the parts feeding apparatus 100 will be discussed in detail later with reference to FIGS. 2 to 7.

The camera 200 is disposed above the worktable to capture the image of the worktable as the space where the work is performed by the worker.

In detail, the camera 200 serves to perform worktable image capturing so that the image of a work object existing on the worktable, parts, a portion of the parts feeding apparatus 100, and a portion of the worker's body are acquired. In this case, the portion of the parts feeding apparatus 100 may be the parts boxes protruding from the parts feeding apparatus 100 toward the worktable. Further, the portion of the worker's body may be the worker's hands.

Further, the camera 200 is disposed above the worktable to capture the image of a position mover 120 of the parts feeding apparatus 100.

In detail, the camera 200 captures the image of the parts located inside the parts boxes grasped by the position mover 120.

The camera 200 may be an RGB camera that acquires color information or an RGB-D camera that acquires depth information as well as color information.

The projector 300 overlays graphic images adequate to situations onto the surface of the work object identified with the image acquired by the camera 200 or onto the surrounding area of the work object under the control of the management server 300.

In detail, the projector 300 produces the graphic image including guide information set according to the work performed on the worktable and projects the graphic image onto the worktable.

Further, the projector 300 produces the graphic image including inspection information corresponding to work inspection results and projects the graphic image onto the worktable under the control of the management server 300.

The management server 400 is a device for controlling overall functions of the parts feeding apparatus 100, the camera 200, the projector 300, and the manager terminal 500.

In detail, the management server 400 allows the worktable as the space where the work is performed to be captured through the camera 200 to identify the work object from the captured worktable image. Further, the management server 400 searches the work corresponding to the identified work object, controls the parts feeding apparatus 100 according to the searched work, and allows the corresponding parts to be aligned. Furthermore, the management server 400 detects guide information set according to the searched work and allows the graphic image including the detected guide information to be produced and projected onto the worktable.

Further, the management server 400 allows the worktable as the space where the work is performed by the worker to be captured and then allows the assembled positions and states of the parts with which the work has been completed according to the captured worktable image to be inspected. Moreover, the management server 400 allows the graphic image including inspection information corresponding to the inspection result to be produced and projected onto the worktable.

A configuration and operations of the management server 400 will be explained in more detail later with reference to FIGS. 8 and 9.

The management server 400 is not limited by the term 'server', and it may be a device that transmits and receives data and executes computing using the transmitted and received data. For example, the management server 400 may be any one of fixed computing devices, such as a desktop, a workstation, a server, and the like, but it may not be limited thereto.

The manager terminal 500 remotely controls the functions of the management server 400 or monitors the control state of the parts feeding apparatus 100 through the management server 400, the worktable image, etc.

The manager terminal 500 is not limited to User Equipment (UE) prescribed in a $3^{rd}$ Generation Partnership Project (3GPP) and may be any device only if the device transmits and receives data to and from the management server 400 and executes computing using the transmitted and received data. For example, the manager terminal 500 may be any one of fixed computing devices, such as a desktop, a workstation, and a server or movable computing devices, such as a smartphone, a laptop, a tablet, a phablet, a Portable Multimedia Player (PMP), a Personal Digital Assistance (PDA), and an E-book reader.

The parts feeding apparatus 100, the camera 200, the projector 300, the management server 400, and the manager terminal 500, as mentioned above, transmit and receive data to and from one another by means of a network where one or more security circuits, local area networks, public wired communication networks, or mobile communication networks, which connect the components, are combined.

For example, the local area networks include one or more of Bluetooth, WiFi, Zigbee, and Near Field Communication (NFC), but they may not be limited thereto.

Further, the public wired communication networks include one or more of ethernet, x Digital Subscriber Line (xDSL), a Hybrid Fiber Coax (HFC), and a Fiber To The Home (FTTH), but they may not be limited thereto.

Besides, the mobile communication networks include one or more of Code Division Multiple Access (CDMA), Wideband CDMA (WCDMA), High Speed Packet Access (HSPA), Long Term Evolution (LTE), and $5^{th}$ generation mobile telecommunication, but they may not be limited thereto.

Hereinafter, an explanation of the parts feeding apparatus 100 according to the present disclosure will be given in detail.

Figure 2:
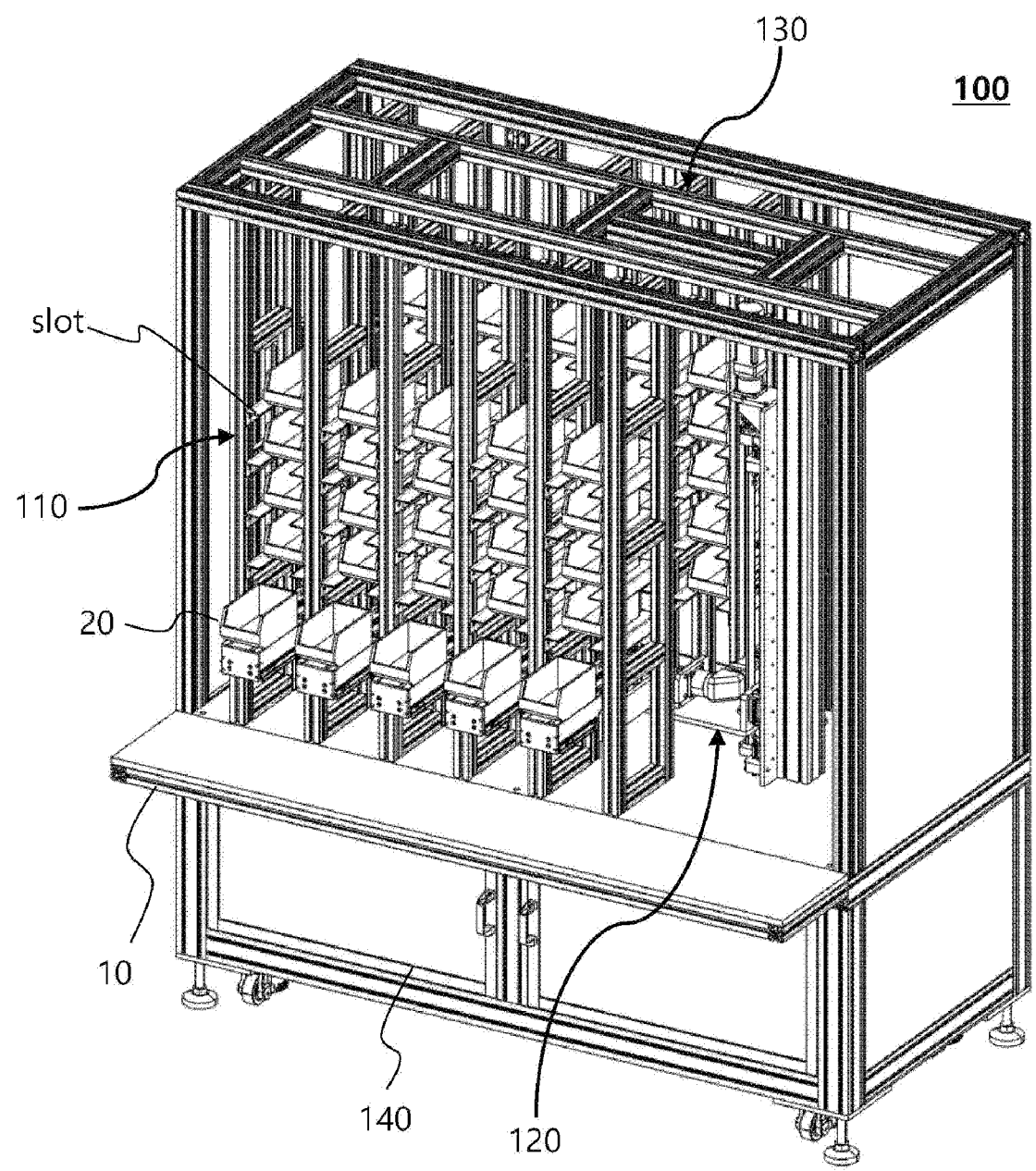
FIG. 2 is a perspective view showing a parts feeding apparatus according to the present disclosure.
Figure 3:
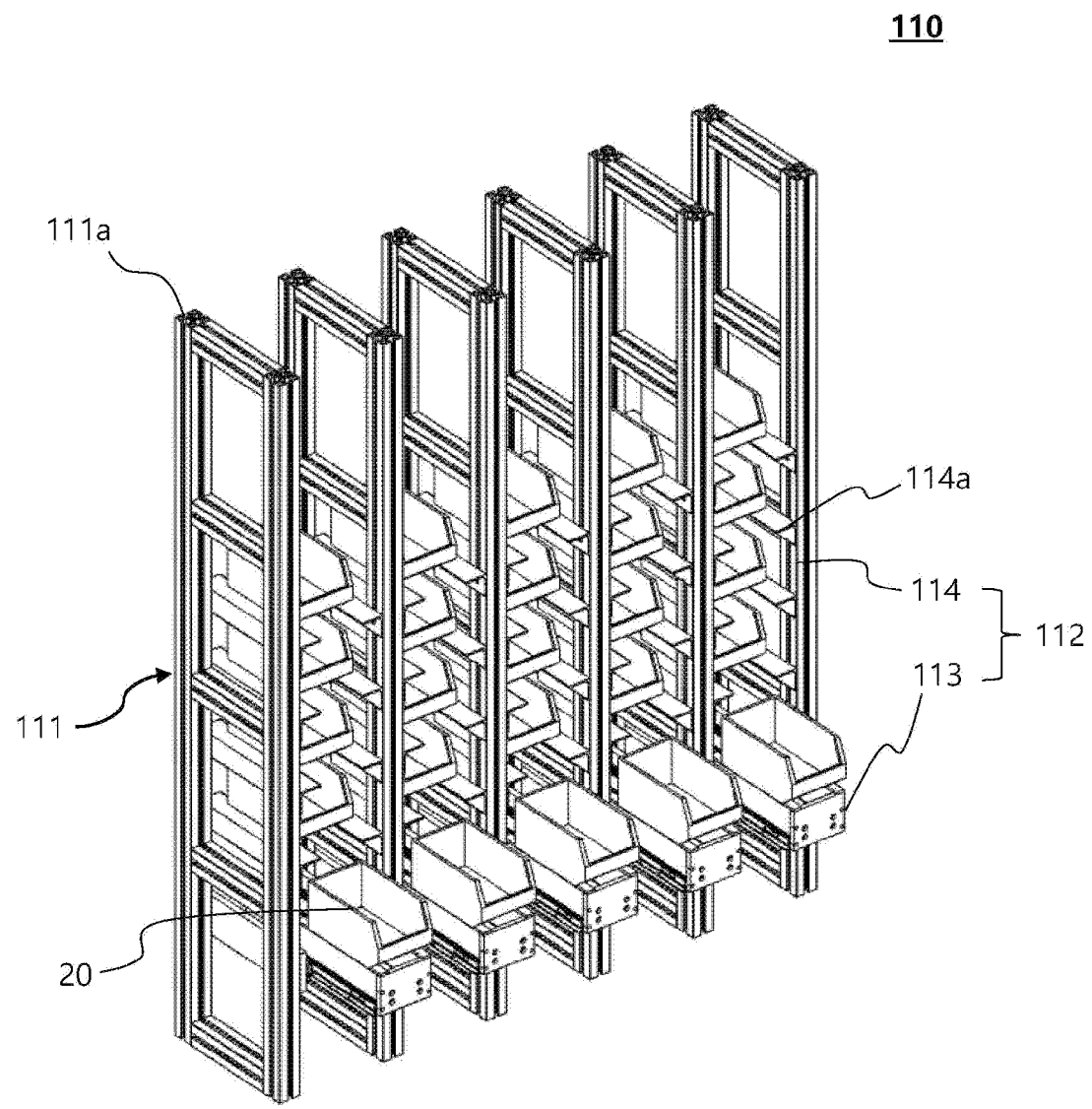
FIG. 3 is a perspective view showing a parts feeder of the parts feeding apparatus according to the present disclosure.
Figure 4:
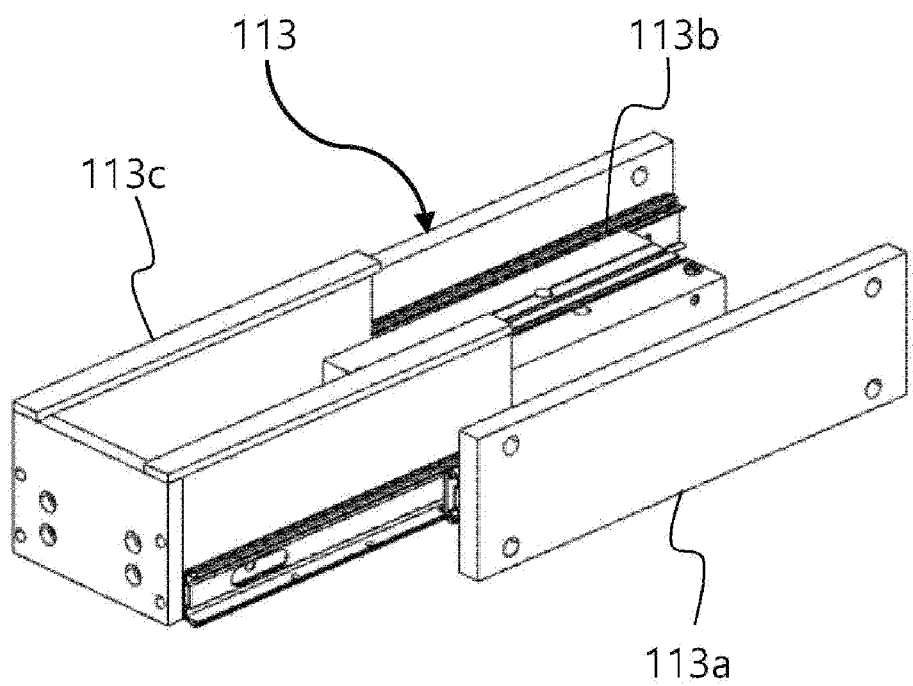
FIG. 4 is a perspective view showing a movable slot of the parts feeding apparatus according to the present disclosure.
Figure 5:
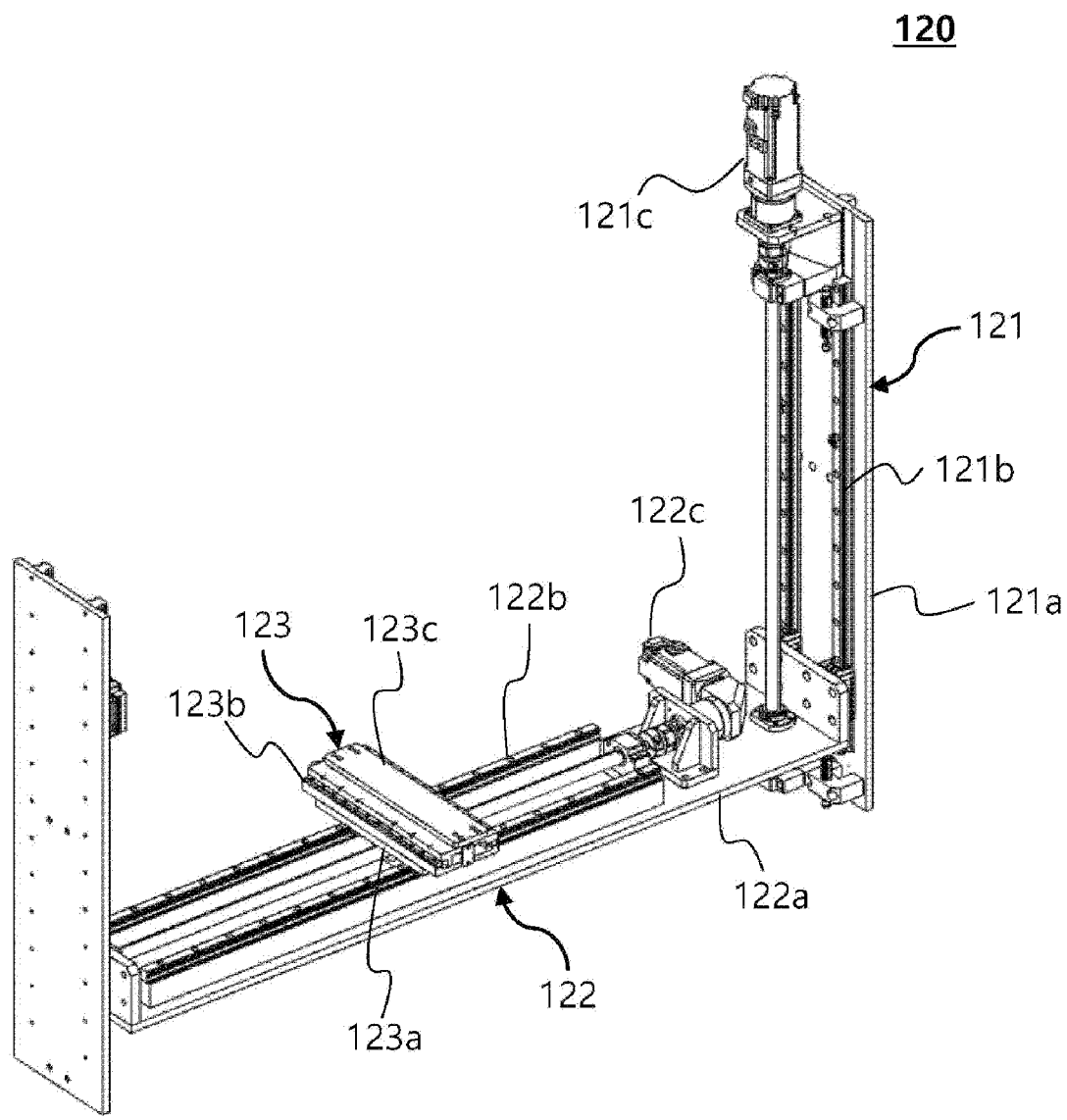
FIG. 5 is a perspective view showing a position mover of the parts feeding apparatus according to the present disclosure.
Figure 6:
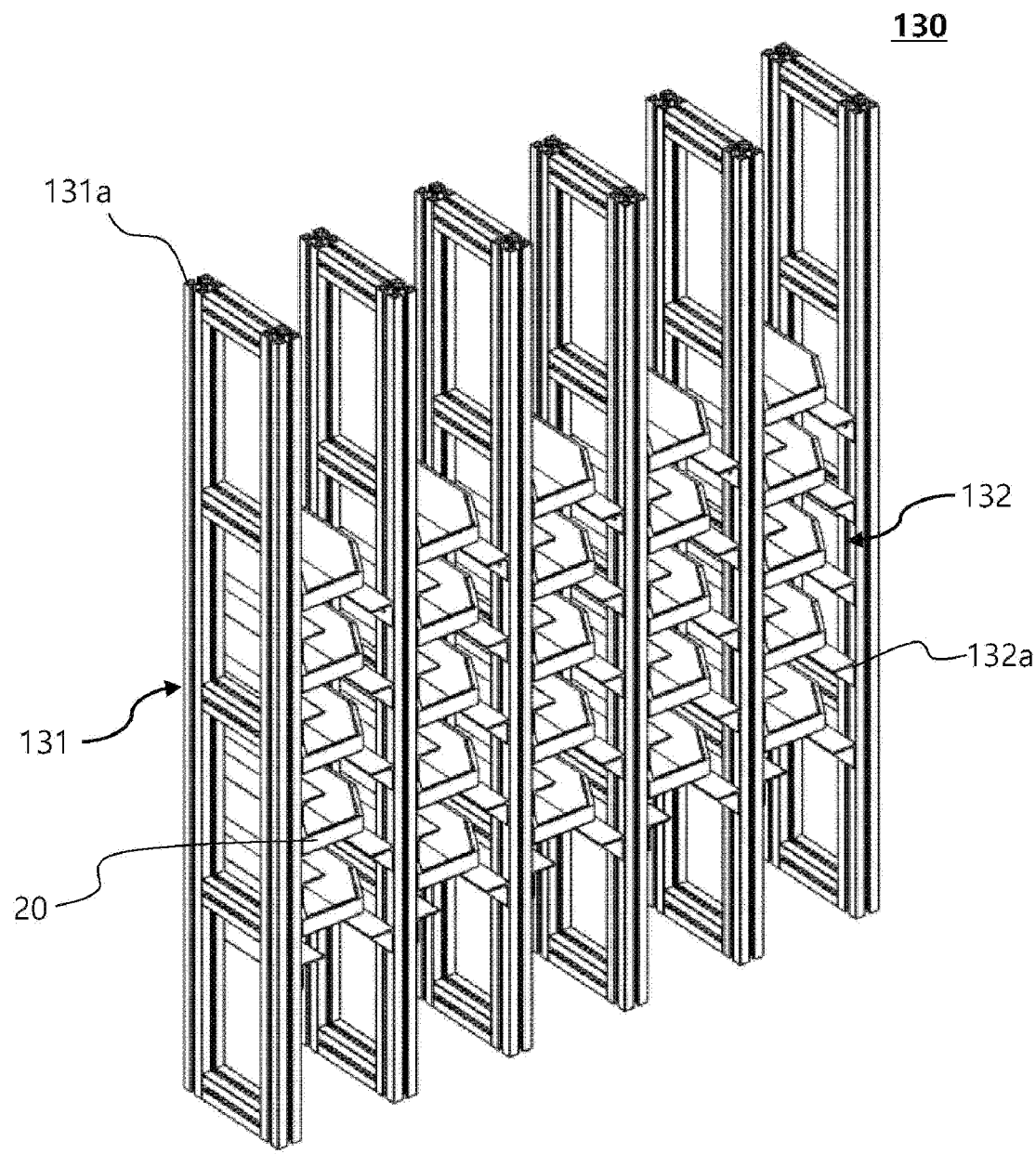
FIG. 6 is a perspective view showing a parts storage unit of the parts feeding apparatus according to the present disclosure.
Figure 7:
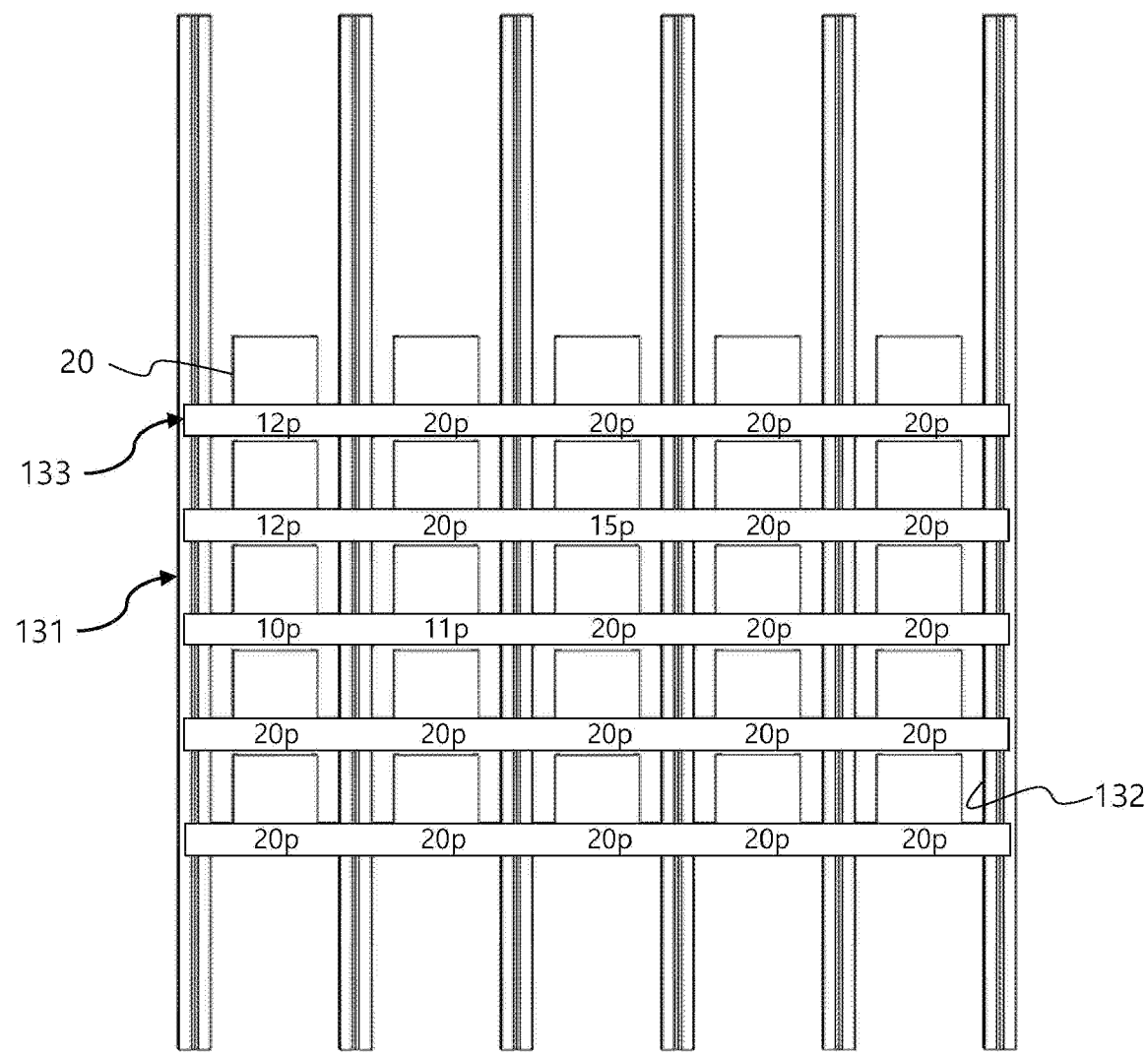
FIG. 7 is a plan view showing the rear surface of the parts storage unit of the parts feeding apparatus according to the present disclosure.

FIG. 2 is a perspective view showing the parts feeding apparatus according to the present disclosure, FIG. 3 is a perspective view showing a parts feeder of the parts feeding apparatus according to the present disclosure, FIG. 4 is a perspective view showing a movable slot of the parts feeding apparatus according to the present disclosure, FIG. 5 is a perspective view showing a position mover of the parts feeding apparatus according to the present disclosure, FIG. 6 is a perspective view showing a parts storage unit of the parts feeding apparatus according to the present disclosure, and FIG. 7 is a plan view showing the rear surface of the parts storage unit of the parts feeding apparatus according to the present disclosure.

Referring to FIGS. 2 to 7, the parts feeding apparatus 100 according to an embodiment of the present disclosure includes a parts feeder 110, a position mover 120, a parts storage unit 130, and a control unit 140.

First, the parts feeder 110 is disposed on one side of a worktable 10 where work is performed. [[ ]] The parts feeder 110 has a plurality of unit slots (labeled "slot" in FIG. 2) each being configured to be loaded with at least one parts box 20. At least one of the parts boxes loaded onto the slots is aligned according to the order of work and fed to the worker.

The parts feeder 110 includes a frame 111 and a plurality of unit slots 112.

The frame 111 forms a plurality of spaces arranged horizontally to the surface of the ground according to the order of work. That is, the frame 111 has a plurality of unit frames 111a equally spaced apart from one another in such a way as to have lengths in vertical directions to the surface of the ground, and accordingly, the frame 111 has the plurality of spaces arranged horizontally with respect to the surface of the ground.

The plurality of unit slots 112 include movable slots 113 and fixed slots 114.

The movable slots 113 are located on the lowermost ends of the plurality of spaces to load the parts boxes 20 according to the order of work by means of the position mover 120, move forward or backward the loaded parts boxes 20 toward the worktable 10, and feed the parts boxes 20 to the worker.

In detail, each movable slot 113 includes a slot body 113a, slot guide bars 113b, and a movable slot body 113c.

The slot body 113a is fixedly disposed to both side unit frames 111a of each space formed on the frame 111. The slot guide bars 113b are fixedly disposed to the slot body 113a in a longitudinal direction of the slot body 113a. The movable slot body 113c loads the parts box thereon and moves forward or backward along the slot guide bars 113b to feed the parts to the worker.

The fixed slots 114 are arranged above the movable slots 113 in such a way as to be vertical to the surface of the ground to allow the parts boxes 20 to be fed to the movable slots 113 to be loaded thereon. In specific, the fixed slots 114 have support rods 114a adapted to support the parts boxes 20 against both side unit frames 111a of each space formed in the frame 111.

In the above-mentioned description, the movable slots 113 are arranged in a line on the lowermost end of the parts feeder 110, and the fixed slots 114 are multi-staged above the movable slots 113, but the present disclosure may not be limited thereto. Accordingly, the movable slots 113 may be multi-staged, and the fixed slots may be arranged in a line.

Next, the position mover 120 serves to load the parts boxes 20 onto the parts feeder 110 or unload the parts boxes 20 loaded on the plurality of slots to move the parts boxes 20 horizontally or vertically so that the parts boxes 20 are changed in position.

The position mover 120 includes a vertical mover 121, a horizontal mover 122, and a grasper 123.

In detail, the vertical mover 121 serves to vertically move the parts boxes 20 in a direction of the slots arranged in the plurality of unit slots 112. The vertical mover 121 includes a first body 121a, first guide bars 121b, and a first driver 121c.

The first body 121a has a given length in the direction of the slots arranged in the plurality of unit slots 112. The first guide bars 121b have given lengths along the first body 121a to guide the vertical movements of the parts boxes 20. The first driver 121c serves to move the horizontal mover 122 along the first guide bars 121b.

The horizontal mover 122 is coupled to the vertical mover 121 in such a way as to be vertically movable and serves to horizontally move the parts boxes 20 in a direction of the plurality of unit slots 112 arranged. The horizontal mover 122 includes a second body 122a, second guide bars 122b, and a second driver 122c.

The second body 122a has a given length in the direction vertical to the first body 121a and is slidably coupled to the first guide bars 121b. The second guide bars 122b have given lengths along the second body 122a to guide the horizontal movements of the parts boxes 20. The second driver 122c serves to move the grasper 123 along the second guide bars 122b.

The grasper 123 is coupled to the horizontal mover 122 in such a way as to be horizontally movable and serves to move forward or backward in a state of grasping the parts box 20 to allow the corresponding parts box 20 to be loaded or unloaded onto or from the parts feeder 110 or the parts storage unit 130. The grasper 123 includes a third body 123a, third guide bars 123b, and a gripper 123c.

The third body 123a has a given length in the direction vertical to the second body 122a and is slidably coupled to the second guide bars 122b in such a way as to move along the second guide bars 122b by means of the second driver 122c. The third guide bars 123b have given lengths along the third body 123a to guide the forward or backward movement of the parts box 20.

The gripper 123c moves forward or backward along the third guide bars 123b toward the parts feeder 110 or the parts storage unit 130 in a state of grasping the parts box and thus loads or unloads the parts box 20 onto or from the parts feeder 110 or the parts storage unit 130. In this case, the gripper 123c is located on the underside of the loaded parts box 20 to grasp the parts box 20 in such a way as to lift the parts box 20 up by means of the vertical mover 121. Without being limited thereto, however, the gripper 123c may grasp the parts box 20 by means of suction or various methods.

Further, the gripper 123c includes a weight sensor for measuring a weight of the parts box 20 grasped thereby.

The parts storage unit 130 faces the parts feeder 110, while the position mover 120 is being located between the parts storage unit 130 and the parts feeder 110, and serves to store the parts boxes 20 to be fed to the parts feeder 110. The parts storage unit 130 includes a frame 131 and a plurality of fixed slots 132.

The frame 131 forms a plurality of spaces arranged horizontally to the surface of the ground according to the order of work. That is, the frame 131 has a plurality of unit frames 131a equally spaced apart from one another in such a way as to have lengths in vertical directions to the surface of the ground, and accordingly, the frame 131 has the plurality of spaces arranged horizontally to the surface of the ground.

The plurality of fixed slots 132 are arranged between the neighboring unit frames 131a in such a way as to vertical to the surface of the ground to allow the parts boxes 20 to be fed to the parts feeder 110 to be loaded thereon. In detail, the fixed slots 132 have support rods 132a adapted to support the parts boxes 20 against both side unit frames 131a of each space formed in the frame 131.

Further, the parts storage unit 130 has output devices 133 adapted to output the number of parts remaining included in the loaded parts boxes 20.

The output devices 133 are located on the rear surface of the frame 131 in such a way as to correspond to the positions of the fixed slots 132 to output the number of parts remaining included in the loaded parts boxes 20. In this case, the output devices 133 output identification information corresponding to the types of parts as well as the number of parts remaining.

Each output device 133 may include an image output device, such as a Liquid Crystal Display (LCD), an Organic Light Emitting Diode (OLED), and an Active Matrix OLED (AMOLED).

The control unit 140 serves to control the overall functions of the parts feeding apparatus 100.

In detail, the control unit 140 controls the parts feeder 110 to allow at least one of the parts boxes 20 loaded onto the plurality of slots to be aligned correspondingly to the order of work and fed to the worktable 10, and further, the control unit 140 controls the position mover 120 to allow the parts boxes 20 to be loaded onto the parts feeder 110 or to allow the parts boxes 20 loaded on the parts feeder 110 to be unloaded to move the unloaded parts boxes 20 horizontally and vertically so that the parts boxes 20 are changed in position. Further, the control unit 140 identifies the types of parts disposed in the parts box 20 grasped by the gripper 123c through the internal image of the camera 200. That is, the control unit 140 compares the shapes of the parts disposed in the grasped parts box 20 with the pre-stored shape images of parts and thus identifies the types of parts disposed in the grasped parts box 20.

Furthermore, the control unit 140 calculates the number of parts disposed in the grasped parts box 20 according to the unit weights of the identified parts and the weight of the grasped parts box 20 measured by the weight sensor.

If the number of parts calculated is smaller than the number of parts required for the work being performed by the worker, the control unit 140 loads the grasped parts box 20 onto the empty slot of the parts storage unit 130 and allows the parts box 20 having the same types of parts as disposed in the parts storage unit 130 to be grasped and fed to the parts feeder 110.

Further, the control unit 140 controls the position mover 120 to allow the parts box 20 having the parts with which the work has been completed to be unloaded from the parts feeder 110 and then calculates the number of parts remaining included in the parts box 20 having the parts with which the work has been completed.

Besides, the control unit 140 loads the parts box 20 having the parts with which the work has been completed onto the parts storage unit 130 and simultaneously outputs the number of parts calculated as well as the identification information corresponding to the types of parts identified through the output devices 133.

Hereinafter, a configuration of the management server 400 according to the present disclosure will be explained in detail.

Figure 8:
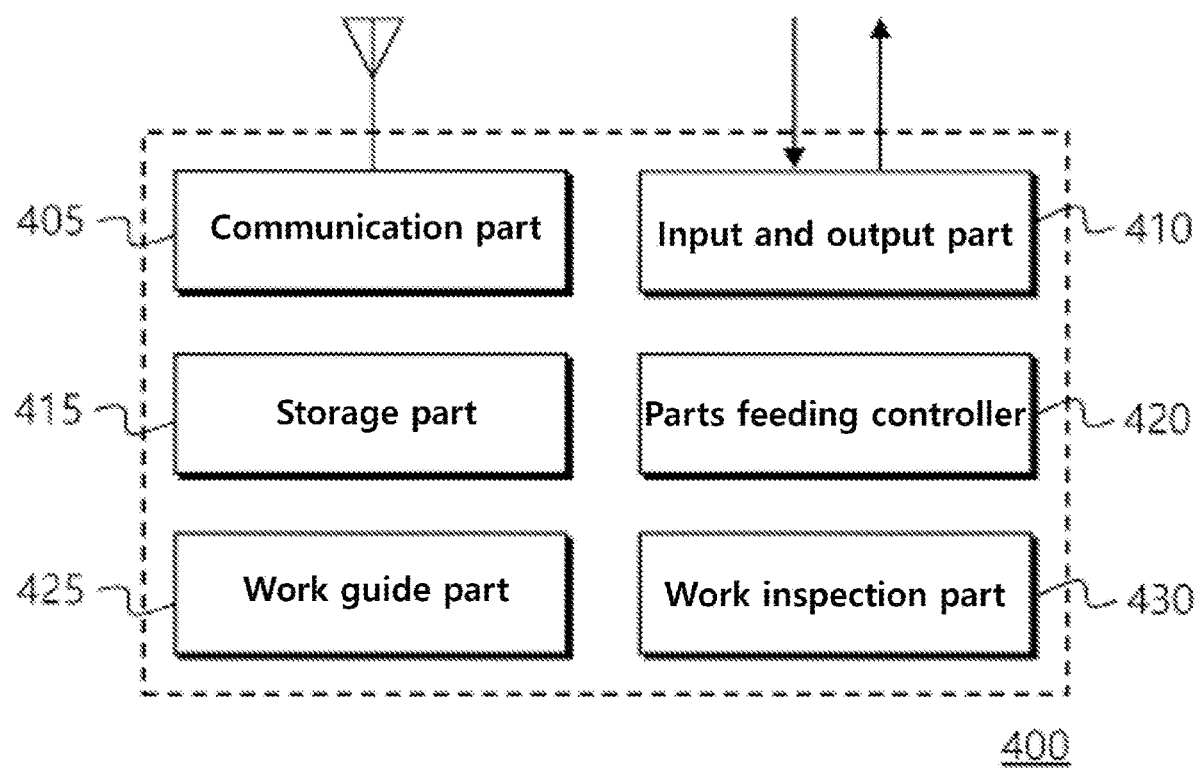
FIG. 8 is a block diagram showing a logical configuration of a management server according to the present disclosure.

FIG. 8 is a block diagram showing a logical configuration of the management server according to the present disclosure.

Referring to FIG. 8, the management server 400 includes a communication part 405, an input and output part 410, a storage part 415, a parts feeding controller 420, a work guide part 425, and a work inspection part 430.

Such components of the management server 400 are just components that are functionally distinguished from one another. Therefore, two or more components may be integrated with one another in a real-world physical environment, and otherwise, one component may be separated from other components in the real-world physical environment.

The communication part 405 transmits control signals for controlling the parts feeding apparatus 100 to the parts feeding apparatus 100.

Further, the communication part 405 receives the images captured through the camera 200. In detail, the communication part 405 receives the color information and depth information acquired by capturing the image of the worktable as the space where the work is performed by the worker through the camera 200.

Furthermore, the communication part 405 transmits the graphic image including guide information to the projector 300. Further, the communication part 405 transmits the graphic image including inspection information corresponding to inspection result to the projector 300.

The input and output part 410 receives signals from a user through User Interface (UI) or outputs the computed result to the outside.

In detail, the input and output part 410 receives the control signals for controlling the parts feeding apparatus 100. Further, the input and output part 410 outputs the images captured by the camera 200 and the control state of the parts feeding apparatus 100.

The storage part 415 stores the data required for the operations of the management server 400.

In detail, the storage part 415 stores a program for controlling the parts feeding apparatus 100, the images captured by the camera 200, etc. Further, the storage part 415 stores the guide information set correspondingly to the work. Furthermore, the storage part 415 stores the program and data for producing the graphic image including the guide information detected. Besides, the storage part 415 stores the program and data for inspecting the assembled positions and states of the parts with which the work has been completed according to the worktable image captured. In addition, the storage part 415 stores the program and data for producing the graphic image including inspection information corresponding to inspection result.

The parts feeding controller 420 serves to control the overall functions of the parts feeding apparatus 100.

In detail, the parts feeding controller 420 controls the parts feeder 110 to allow at least one of the parts boxes 20 loaded onto the plurality of slots to be aligned correspondingly to the order of work and fed to the worktable 10, and further, the parts feeding controller 420 controls the position mover 120 to allow the parts boxes 20 to be loaded onto the parts feeder 110 or allow the parts boxes loaded on the parts feeder 110 to be unloaded to move the unloaded parts boxes 20 horizontally and vertically so that the parts boxes 20 are changed in position.

Further, the parts feeding controller 420 identifies the types of parts disposed in the parts box 20 grasped by the gripper 123c through the internal image of the camera 200. That is, the parts feeding controller 420 compares the shapes of the parts disposed in the grasped parts box 20 with the pre-stored shape images of parts and thus identifies the types of parts disposed in the grasped parts box 20.

Furthermore, the parts feeding controller 420 calculates the number of parts disposed in the grasped parts box 20 according to the unit weights of the identified parts and the weight of the grasped parts box 20 measured by the weight sensor.

If the number of parts calculated is smaller than the number of parts required for the work being performed by the worker, the parts feeding controller 420 loads the grasped parts box 20 onto the empty slot of the parts storage unit 130 and allows the parts box 20 having the same types of parts as disposed in the parts storage unit 130 to be grasped and fed to the parts feeder 110.

Further, the parts feeding controller 420 controls the position mover 120 to allow the parts box 20 having the parts with which the work has been completed to be unloaded from the parts feeder 110 and then calculates the number of parts remaining included in the parts box 20 having the parts with which the work has been completed.

Besides, the parts feeding controller 420 loads the parts box 20 having the parts with which the work has been completed onto the parts storage unit 130 and simultaneously outputs the number of parts calculated as well as the identification information corresponding to the types of parts identified through the output devices 133.

The work guide part 425 serves to receive the captured image of the worktable as the space in which the work is performed and identifies a work object from the received worktable image.

The work guide part 425 detects the edges existing on the captured image. The work guide part 425 makes use of any one of a Laplacian of Gaussian (LoG) algorithm and a Difference of Gaussian (DoG) algorithm to perform the edge detection from the image.

In the case of using the LoG algorithm, for example, the work guide part 425 removes the noise existing in the image through a Gaussian filter. The work guide part 425 applies a Laplacian filter to the image from which the noise is removed. Next, the work guide part 425 detects a zero crossing from the image to which the Laplacian filter is applied and performs the edge detection.

In the case of using the DoG algorithm, for another example, the work guide part 425 produces two Gaussian masks with different distributions from the image. The work guide part 425 subtracts the other mask from one mask produced. Next, the work guide part 425 applies the subtracted mask to the image and performs the edge detection.

The work guide part 425 detects one or more enclosures through the detected edges. In this case, the work guide part 425 first performs binarization on the image to make the edges obviously enclosed.

The work guide part 425 compares the detected one or more enclosures with the shape of an object as a predetermined object to identify the work object from the image.

Further, the work guide part 425 searches the work corresponding to the identified work object and controls the parts feeding apparatus 100 according to the searched work to allow the parts to be aligned.

In this case, the work guide part 425 sequentially provides the parts boxes having the corresponding parts according to the order of work in the direction of the slots arranged in the parts feeding apparatus 100.

For example, the work guide part 425 controls the parts feeding device 100 according to the searched work to allow the parts to be aligned and fed to the worktable at a time, and otherwise, the work guide part 425 feeds the parts to the worktable individually according to the order of work.

Further, the work guide part 425 detects the guide information set according to the searched work.

Besides, the work guide part 425 produces the graphic image including the detected guide information and projects the produced graphic image onto the worktable.

In detail, the work guide part 425 has content set according to the searched work and thus produces the graphic image for executing augmented reality (AR). Like this, the content included in the graphic image for executing the AR includes a work operation sheet, information for overlaying the graphic image related to work onto the surface of the work object or the region around the work object, parts information, and the like.

That is, the work guide part 425 visualizes the augmented content produced by combining virtual space with real space through the projector 300. To do this, the work guide part 425 performs a calibration step between the camera 200 and the projector 300 and calculates mapping parameters for calculating correlations between the real space and the virtual three-dimensional coordinate space to project the augmented content.

For example, the work guide part 425 acquires intrinsic parameters and extrinsic parameters of the camera 200 and the projector 300 at the calibration step, combines the intrinsic and extrinsic parameters, and maps the real space and the virtual space so that they are the same as each other.

The above-mentioned processes of the work guide part 425 are performed according to correlation analysis based on various patterns utilized in computer vision.

Further, the work guide part 425 projects the identification information representing the order of work onto a positions of the worktable corresponding to the positions of the parts boxes fed from the parts feeding apparatus 100.

For example, if the plurality of parts boxes are fed from the parts feeding apparatus 100, the work guide part 425 projects the numbers representing the order of work onto the positions of the worktable corresponding to the positions of the parts boxes to allow the order of work to be intuitively recognized by the worker.

Further, the work guide part 425 captures the image of the worktable onto which the graphic image is projected, calculates the reflectivity of the work object from the captured image of the worktable, and adjusts the quantity of light of the graphic image according to the calculated reflectivity.

In this case, the work guide part 425 identifies the type of work object included in the captured image of the worktable and calculates the reflectivity of the work object according to the material corresponding to the identified type of work object.

For example, if the reflectivity of the work object is high, the worker's eyes dazzle due to the light emitted from the projector 300, thereby having a bad influence on the work. Accordingly, if the reflectivity of the work object is higher than a predetermined value, the work guide part 425 adjusts the quantity of light of the graphic image projected from the projector 300.

In this case, the work guide part 425 adjusts the blue color value among RGB (red, green, and blue) values when the quantity of light of the graphic image is adjusted and thus provides the vivid graphic image to the worker, thereby reducing the fatigue of the worker's eyes.

Further, the work guide part 425 identifies the worker's hands from the captured image of the worktable and calculates the worker's posture through the mean value of the sizes of the hands identified for a predetermined period of time. The work guide part 425 adjusts the size of the graphic image according to the calculated worker's posture.

In this case, the work guide part 425 calculates a distance between the camera and the worker's hands through the mean value of the sizes of the identified hands and calculates the worker's posture based on the calculated distance.

For example, if the worker's hands are identified on the image captured by the camera fixedly located above the worker, the sizes of the identified hands are varied according to the distance between the camera and the worker's hands.

If the mean value of the sizes of the identified hands is higher than a predetermined value, accordingly, the work guide part 425 determines that while the worker stands up, the work is performed.

Further, if the mean value of the sizes of the identified hands is lower than the predetermined value, the work guide part 425 determines that while the worker sits, the work is performed.

When the graphic image including the work operation sheet corresponding to the work performed is projected, further, the work guide part 425 adjusts the size of the work operation sheet according to the calculated worker's posture.

For example, if the worker performs the work in the state of standing up, the distance between the worker's eyes and the worktable becomes long, and in this case, the work guide part 425 increases the size of the work operation sheet and projects the work operation sheet with the increased size. Further, if the worker performs the work in the state of sitting on the chair, the distance between the worker's eyes and the worktable becomes short, and in this case, the work guide part 425 decreases the size of the work operation sheet and projects the work operation sheet with the decreased size.

The work inspection part 430 receives the captured image of the worktable as the space where the work is performed by the worker and inspects the assembled position and state of the part with which the work has been completed on the received image of the worktable.

In detail, if the work inspection part 430 senses an operation with which the part is drawn by the worker from one of the parts boxes aligned according to the order of work by the parts feeding apparatus 100, the work inspection part 430 determines that the work using a part at a pre-step has been completed.

In this case, the work inspection part 430 receives the information of the load of the parts box from the parts feeding apparatus 100 and senses the operation with which the part is drawn by the worker through the quantity of change of the received load.

If the parts box is fed according to the order of work from the parts feeding apparatus 100, further, the work inspection part 430 inspects the work through a first image capturing the fed parts box and a second image capturing the part provided in the parts box included in the first image just before the part is assembled. In this case, the moment just before the part is assembled may be a time point when the width of the part identified in the second image is decreased.

In detail, the work inspection part 430 identifies the parts included in the first image and the second image, measures the widths of the identified parts, and calculates the depth value of the part included in the second image according to a difference between the width of the part identified on the first image and the width of the part identified on the second image.

That is, the work inspection part 430 makes use of the fixed camera to calculate the depth value of the parts just before the corresponding part is assembled through the relative quantity of change of the width of the part according to the position of the part with respect to the width of the part disposed in the parts box.

Further, the work inspection part 430 inspects the assembled position based on the coordinate values of the part and the calculated depth value on the second image. That is, the work inspection part 430 acquires x and y coordinates of the part on the second image, acquires a z coordinate of the part based on the calculated depth value, and inspects the assembled position.

Furthermore, the work inspection part 430 recognizes a predetermined color of the worktable as a background from the captured image of the worker, removes the predetermined color of the worktable from the captured image of the worker, detects the edges from the image from which the background is removed, and detects one or more enclosures through the detected edges.

In this case, the work inspection part 430 removes the enclosures determined as the body of the worker from the detected enclosures and inspects the work through the image from which the enclosures determined as the body of the worker are removed.

In this case, the work inspection part 430 calculates the brightness values of the enclosures, and if the calculated brightness values are lower than predetermined threshold values, the work inspection part 430 determines the enclosures as the worker's body and removes the enclosures.

Under the assumption that the projector 300 projects the graphic image, while facing the worker, and the camera 200 captures the image of the worktable above the worktable, that is, the work inspection part 430 determines the worker's body through a difference between an area to which the light emitted from the projector 300 is irradiated and an area to which the light is not irradiated.

Further, if the work inspection part 430 senses an operation with which the part is drawn by the worker from one of the parts boxes aligned according to the order of work by the parts feeding apparatus 100, the work inspection part 430 projects the standard image corresponding to the part drawn by the worker onto one side of the worktable, and if the part is located within the standard image projected, the work inspection part 430 compares the standard image with the image of the part drawn by the worker to determine whether the part is defective.

That is, before the work is performed after the part has been drawn by the worker from one of the parts boxes, if the part drawn by the worker is located exactly within the standard image projected, the work inspection part 430 compares the standard image with the captured image of the part drawn by the worker to determine whether the part is defective.

In this case, the standard image is a good quality image of the part drawn by the worker, and the standard image having the same size as the real size of the part drawn by the worker is projected.

Further, the work inspection part 430 produces the graphic image including the inspection information corresponding to the inspection result and projects the produced graphic image onto the worktable.

For example, the work inspection part 430 produces the graphic image including the reason for defect on the assembled position or state of the part whose assembled position and state is defective and projects the produced graphic image onto the worktable.

Next, an explanation of a hardware configuration of the management server 400 for operating the logical components of the management server 400 will be given in detail.

Figure 9:
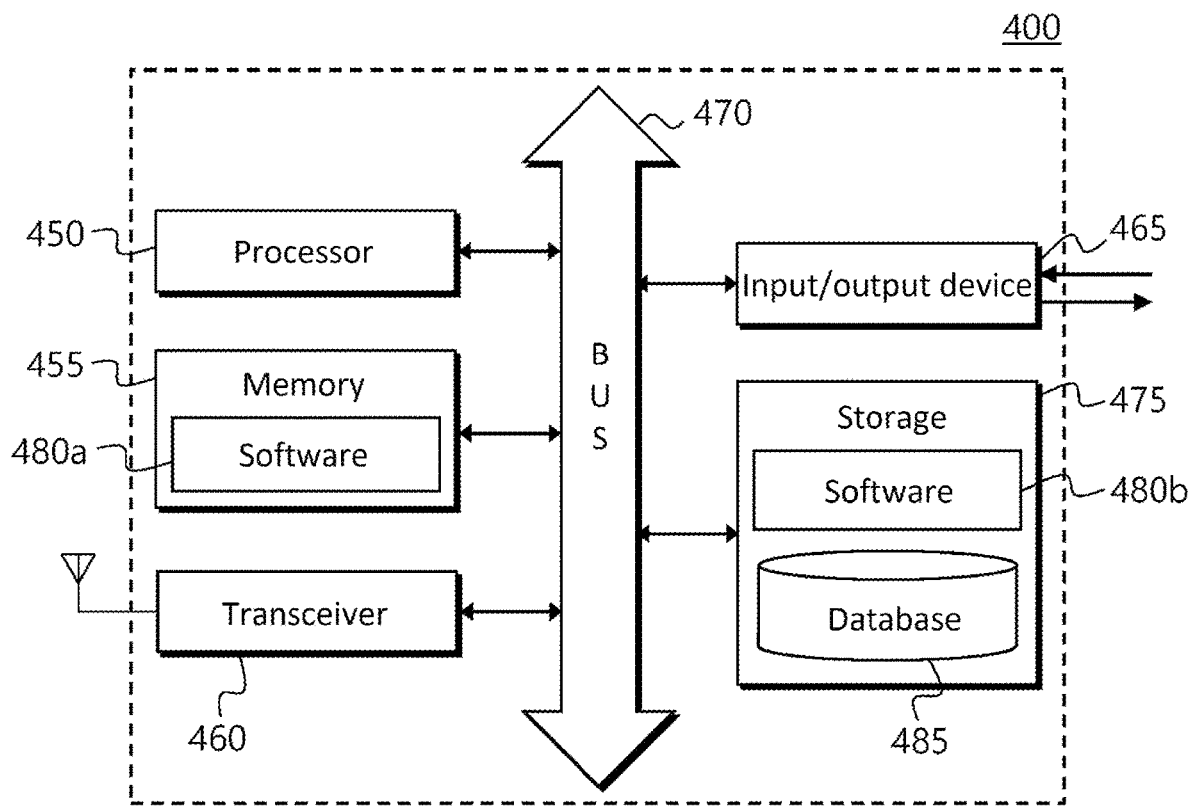
FIG. 9 is a block diagram showing a hardware configuration of the management server according to the present disclosure.

FIG. 9 is a block diagram showing a hardware configuration of the management server according to the present disclosure.

As shown in FIG. 9, the management server 400 includes a processor 450, a memory 455, a transceiver 460, an input/output device 465, a data bus 470, and a storage 475.

The processor 450 allows the operations and functions of the management server 400 to be performed according to the commands of software 480a loaded in the memory 455. The software 480a with which the method of the present disclosure is performed is loaded in the memory 455. The transceiver 460 transmits and receives data to and from the parts feeding apparatus 100, the camera 200, the projector 300, and the manager terminal 500. The input/output device 465 receives the data required for the operations of the management server 400 and transmits the control state information of the parts feeding apparatus 100 and the projector 300. The data bus 470 is connected to the processor 450, the memory 455, the transceiver 460, the input/output device 465, and the storage 475 and serves as a transfer path along which data among the respective components are transferred.

The storage 475 stores Application Programming Interface (API), library file, resource file, and the like that are required to execute the software 480a with which the method of the present disclosure is performed. The storage 475 stores software 480b with which the method of the present disclosure is performed. Further, the storage 475 stores information needed to perform a work guide method or a work inspection method.

According to an embodiment of the present disclosure, the software 480a or 480b that is loaded in the memory 455 or stored in the storage 475 may be a computer program recorded in a recording medium that allows the processor 450 to receive the captured image of the worktable as the space where the work is performed, allows the processor 450 to identify the work object in the received worktable image, allows the processor 450 to search the work corresponding to the identified work object, control the parts feeding apparatus according to the searched work, and align the parts, allows the processor 450 to detect the guide information set according to the searched work, and allows the processor 450 to produce the graphic image including the detected guide information and project the produced graphic image onto the worktable.

According to another embodiment of the present disclosure, the software 480a or 480b that is loaded in the memory 455 or stored in the storage 475 may be a computer program recorded in a recording medium that allows the processor 450 to receive the captured image of the worktable as the space where the work is performed by the worker, allows the processor 450 to inspect the assembled position and state of the part with which the work has been completed on the received worktable image, and allows the processor 450 to produce the graphic image including the inspection information corresponding to the inspection result and project the produced graphic image onto the worktable.

In detail, the processor 450 may include an Application-Specific Integrated Circuit (ASIC), a chipset, a logical circuit and/or data processing device. The memory 455 may include a Read-Only Memory (ROM), a Random Access Memory (RAM), a flash memory, a memory card, a storage medium and/or other storage devices. The transceiver 460 may include a baseband circuit for processing wired and wireless signals. The input/output device 465 may include an input device such as a keyboard, a mouse, and/or a joystick, an image output device such as an LCD, an Organic LED (OLED), and/or an Active Matrix OLED (AMOLED), and a printing device such as a printer and a plotter.

If the embodiment of the present disclosure is implemented by software, the above-mentioned method may be performed by a module (process, function, etc.) executing the above-mentioned functions. The module may reside in the memory 455 and be performed by the processor 450. The memory 455 may be located inside or outside the processor 450 in such a way as to be connected to the processor 450 through well-known various means.

The components as shown in FIG. 9 may be configured with various means, such as hardware, firmware, software, and combinations thereof. If the components are configured with hardware, the present disclosure may be implemented by one or more hardware such as ASICs, Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

If the components are configured with firmware or software, the present disclosure may be implemented in the form of the module, process, and function executing the above-mentioned functions and operations and may be recorded in a computer readable recording medium. The computer readable medium may include a program command, a data file, a data structure, and the like independently or in combination. The program instruction recorded in the recording medium is specially designed and constructed for the present disclosure, but may be well known to and may be used by those skilled in the art of computer software. The computer readable recording medium may include a magnetic medium such as a hard disc, a floppy disc, and a magnetic tape, an optical recording medium such as a Compact Disc Read Only Memory (CD-ROM) and a Digital Versatile Disc (DVD), a magneto-optical medium such as a floptical disk, and a hardware device specifically configured to store and execute program instructions, such as a Read Only Memory (ROM), a Random Access Memory (RAM), and a flash memory. Further, the program command may include a machine language code generated by a compiler and a high-level language code executable by a computer through an interpreter and the like. The hardware device may be configured to operate as one or more software modules in order to perform operations of the present disclosure, and vice versa.

Hereinafter, an explanation of a work guide method according to the present disclosure will be given in detail.

Figure 10:
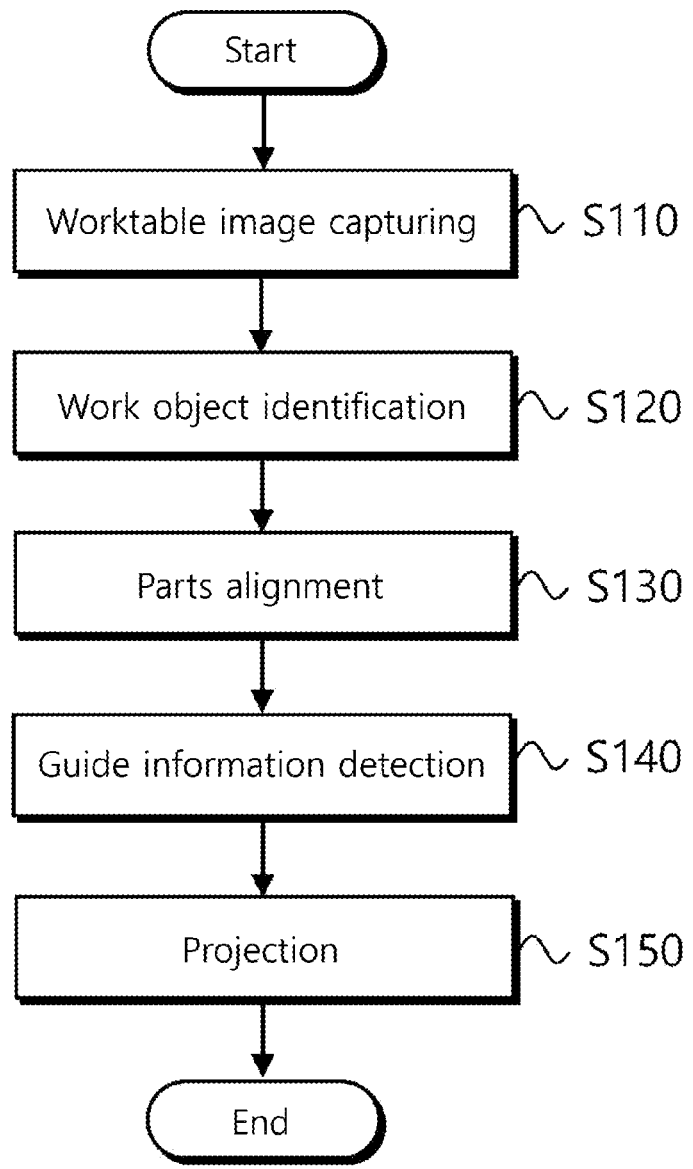
FIG. 10 is a flowchart showing a work guide method according to the present disclosure.

FIG. 10 is a flowchart showing a work guide method according to the present disclosure.

Referring to FIG. 10, the management server receives the captured image of the worktable as the space where the work is performed from the camera in step S110.

Next, the management server identifies the work object in the received worktable image in step S120.

In detail, the management server detects the edges existing in the captured image, detects one or more enclosures through the detected edges, compares the shapes of the detected one or more enclosures with the predetermined shape of the work object, and identifies the work object from the image.

After that, the management server searches the work corresponding to the work object identified in the step S120, controls the parts feeding apparatus according to the searched work, and aligns the corresponding parts in step S130.

In this case, the management server sequentially provides the parts boxes having the parts corresponding to the order of work according to the direction of the slots arranged in the parts feeding apparatus.

Next, the management server detects the guide information set according to the searched work in step S140.

After that, the management server produces the graphic image including the detected guide information and projects the produced graphic image onto the worktable in step S150.

In detail, the management server has content set according to the searched work and thus produces the graphic image for executing augmented reality (AR). Like this, the content included in the graphic image for executing the AR includes a work operation sheet, information for overlaying the graphic image related to work onto the surface of the work object or the region around the work object, parts information, and the like.

That is, the management server visualizes the augmented content produced by combining virtual space with real space through the projector. To do this, the management server performs a calibration step between the camera and the projector and calculates mapping parameters for calculating correlations between the real space and the virtual three-dimensional coordinate space to project the augmented content.

Further, the management server projects the identification information representing the order of work onto positions of the worktable corresponding to the positions of the parts boxes fed from the parts feeding apparatus.

Further, the management server captures the image of the worktable onto which the graphic image is projected, calculates the reflectivity of the work object from the captured image of the worktable, and adjusts the quantity of light of the graphic image according to the calculated reflectivity.

In this case, the management server identifies the type of work object included in the captured image of the worktable and calculates the reflectivity of the work object according to the material corresponding to the identified type of work object.

In this case, the management server adjusts the blue color value among RGB (red, green, and blue) values when the quantity of light of the graphic image is adjusted and thus provides the vivid graphic image to the worker, thereby reducing the fatigue of the worker's eyes.

Further, the management server identifies the worker's hands from the captured image of the worktable, calculates the worker's posture through the mean value of the sizes of the hands identified for a predetermined period of time, and adjusts the size of the graphic image according to the calculated worker's posture.

In this case, the management server calculates a distance between the camera and the worker's hands through the mean value of the sizes of the identified hands and calculates the worker's posture based on the calculated distance.

Further, if the mean value of the sizes of the identified hands is lower than a predetermined value, the management server determines that while the worker is sitting, the work is performed.

When the graphic image including the work operation sheet corresponding to the work performed is projected, further, the management server adjusts the size of the work operation sheet according to the calculated worker's posture.

Hereinafter, an explanation of a work inspection method according to the present disclosure will be given in detail.

Figure 11:
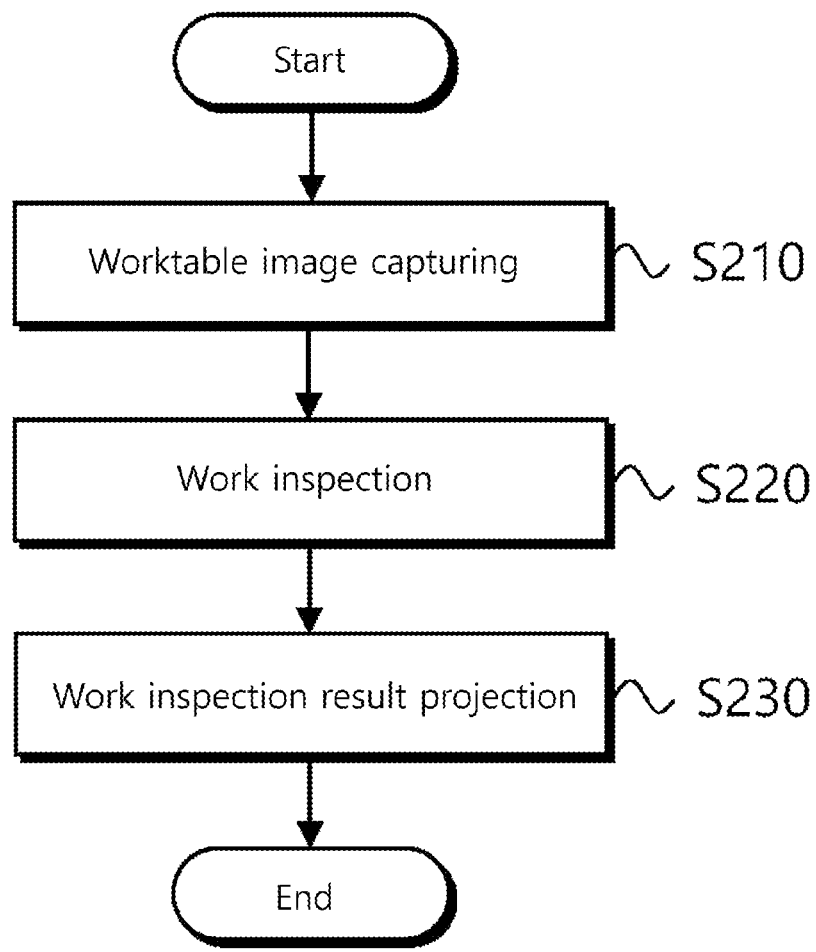
FIG. 11 is a flowchart showing a work inspection method according to the present disclosure.

FIG. 11 is a flowchart showing a work inspection method according to the present disclosure.

Referring to FIG. 11, the management server receives the captured image of the worktable as the space where the work is performed by the worker from the camera in step S210.

Next, the management server inspects the assembled position and state of the part with which the work has been completed on the received worktable image in step S220.

In detail, if the management server senses an operation with which the part is drawn by the worker from one of the parts boxes aligned according to the order of work by the parts feeding apparatus, the management server determines that the work using a part at a pre-step has been completed.

In this case, the management server receives the information of the load of the parts box from the parts feeding apparatus and senses the operation with which the part is drawn by the worker through the quantity of change of the received load.

If the parts box is fed according to the order of work from the parts feeding apparatus, further, the management server inspects the work through a first image capturing the fed parts box and a second image capturing the part provided in the parts box included in the first image just before the part is assembled. In this case, the moment just before the part is assembled may be a time point when the width of the part identified in the second image is decreased.

In detail, the management server identifies the parts included in the first image and the second image, measures the widths of the identified parts, and calculates the depth value of the part included in the second image according to a difference between the width of the part identified on the first image and the width of the part identified on the second image.

That is, the management server makes use of the fixed camera to calculate the depth value of the part just before the part is assembled through the relative quantity of change of the width of the part according to the position of the part with respect to the width of the part disposed in the parts box.

Further, the management server inspects the assembled position based on the coordinate values of the part and the calculated depth value on the second image. That is, the management server acquires x and y coordinates of the part on the second image, acquires a z coordinate of the part based on the calculated depth value, and inspects the assembled position.

Furthermore, the management server recognizes a predetermined color of the worktable as a background from the captured image of the worker, removes the predetermined color of the worktable from the captured image of the worker, detects the edges from the image from which the background is removed, and detects one or more enclosures through the detected edges.

In this case, the management server removes the enclosures determined as the body of the worker from the detected enclosures and inspects the work through the image from which the enclosures determined as the body of the worker are removed.

In this case, the management server calculates the brightness values of the enclosures, and if the calculated brightness values are lower than predetermined threshold values, the management server determines the enclosures as the worker's body and removes the enclosures.

Further, if the management server senses an operation with which the part is drawn by the worker from one of the parts boxes aligned according to the order of work by the parts feeding apparatus, the management server projects the standard image corresponding to the part drawn by the worker onto one side of the worktable, and if the part is located within the standard image projected, the management server compares the standard image with the image of the part drawn by the worker to determine whether the part is defective.

In this case, the standard image is a good quality image of the part drawn by the worker, and the standard image having the same size as the real size of the part drawn by the worker is projected.

Next, the management server produces the graphic image including the inspection information corresponding to the inspection result and projects the produced graphic image onto the worktable in step S230.

Figure 12:
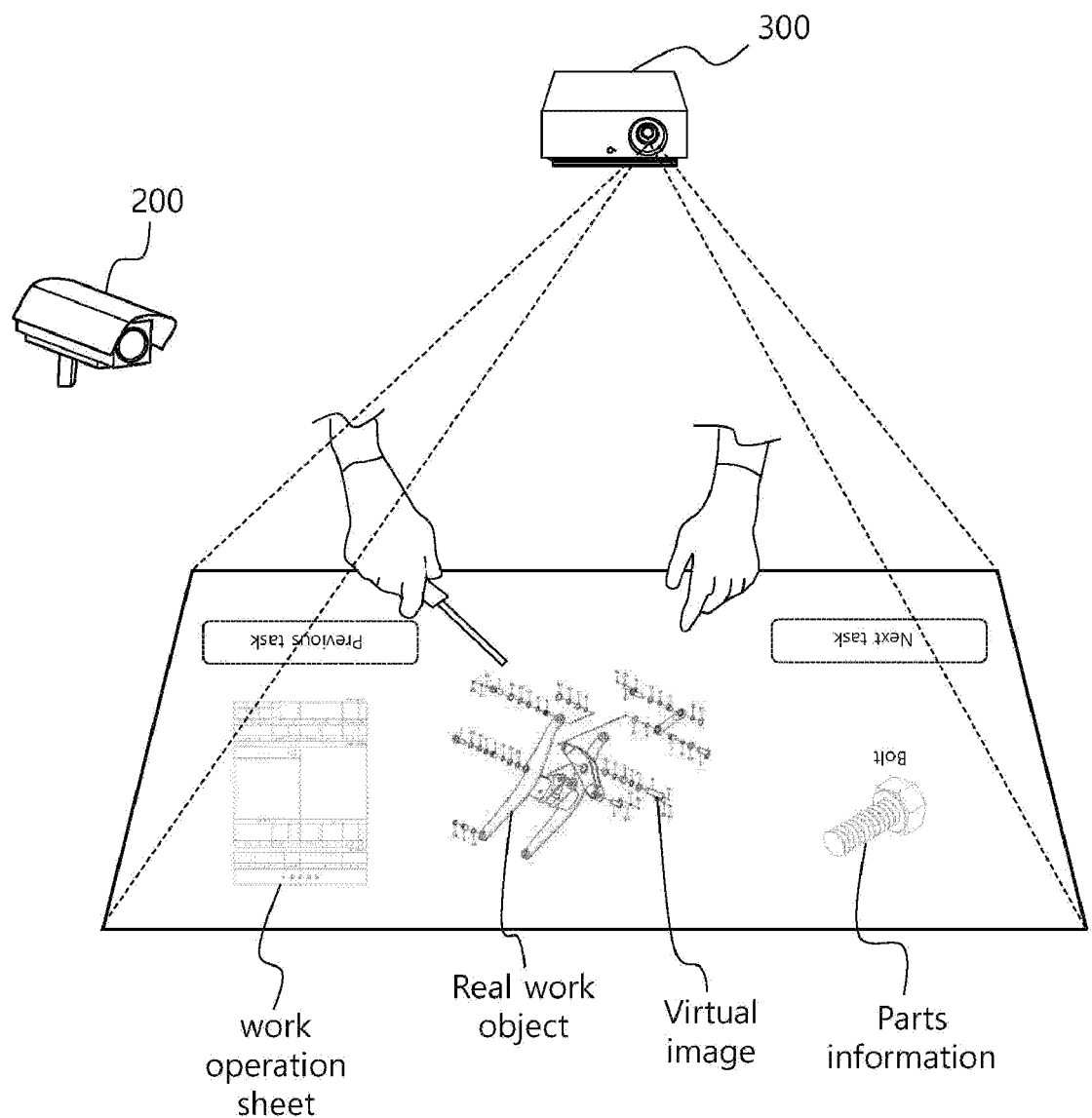
FIG. 12 is an exemplary view showing a work guide method according to the present disclosure.

FIG. 12 is an exemplary view showing the work guide method according to the present disclosure.

As shown in FIG. 12, the management server includes content set according to the searched work and thus produces the graphic image for executing augmented reality (AR). Like this, the content included in the graphic image for executing the AR includes a work operation sheet, information for overlaying the graphic image related to work onto the surface of the work object or the region around the work object, parts information, and the like.

That is, the management server visualizes the augmented content produced by combining virtual space with real space through the projector. To do this, the management server performs a calibration step between the camera and the projector and calculates mapping parameters for calculating correlations between the real space and the virtual three-dimensional coordinate space to project the augmented content.

For example, the management server acquires intrinsic parameters and extrinsic parameters of the camera and the projector at the calibration step, combines the intrinsic and extrinsic parameters, and maps the real space and the virtual space with each other so that the real space and the virtual space are the same as each other.

As described above, the parts feeding apparatus according to the present disclosure serves to store the parts used for work, align the stored parts according to the order of work, and feed the aligned parts to the worker, so that it is possible to perform fast handling when the work is changed and the parts are prevented from being erroneously used.

Although specific embodiments have been illustrated and described herein, it will be appreciated by those of ordinary skill in the art that any arrangement, which is calculated to achieve the same purpose, may be substituted for the specific embodiment shown. The terminology used in the present disclosure is for the purpose of describing exemplary embodiments only and is not intended to limit the present disclosure. Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A parts feeding apparatus comprising:
a parts feeder disposed on one side of a worktable and configured to feed parts to the worktable where work is performed, the parts feeder including a plurality of unit slots;
a parts storage disposed to face the parts feeder, the parts storage having a plurality of storage unit slots configured to be loaded with at least one parts box;
a position mover disposed between the parts feeder and the parts storage, the position mover being configured to load the at least one parts box from the plurality of storage unit slots onto the plurality of unit slots, or to load the at least one parts box from the plurality of unit slots onto the plurality of storage unit slots, wherein the position mover is configured to move the at least one parts box horizontally or vertically according to an order of work; and
a controller configured to control the parts feeder to feed the parts to the worktable according to the order of work, and to control the position mover to load the at least one parts box onto the parts feeder from the parts storage and load the at least one parts box onto the parts storage from the parts feeder,
wherein the parts feeder includes:
a frame having a plurality of spaces;
the plurality of unit slots, each being disposed in each of the plurality of spaces in a vertical direction,
wherein each of the plurality of unit slots includes:
a movable slot disposed on a lowermost end of each of the plurality of spaces and configured to receive the at least one parts box from a fixed slot according to the order of work; and
a plurality of fixed slots vertically disposed above the movable slot, and
wherein the movable slot includes:
a slot body fixedly disposed to a corresponding space on the frame;
a movable slot body configured to receive the at least one parts box thereon according to the order of work, the movable slot body being configured to move forward or backward in a longitudinal direction of the slot body to feed the parts from the at least one parts box to the worktable according to the order of work; and
slot guide bars disposed on the slot body to guide the forward or backward movement of the movable slot body.

2. The parts feeding apparatus according to claim 1, wherein the position mover comprises:
a vertical mover configured to vertically move the at least one parts box in a direction of the plurality of unit slots;
a horizontal mover coupled to the vertical mover to move the at least one parts box along a horizontal direction of the plurality of unit slots; and
a grasper coupled to the horizontal mover to move horizontally, the grasper being configured to move forward or backward while grasping one of the at least one parts box to load or unload the one of the at least one parts box onto or from the parts feeder or the parts storage.

3. The parts feeding apparatus according to claim 2, wherein the vertical mover comprises:
a first body having a given length in the direction of the plurality of unit slots;
first guide bars having given lengths along the first body to guide the vertical movements of the at least one parts box; and
a first driver configured to move the horizontal mover along the first guide bars.

4. The parts feeding apparatus according to claim 3, wherein the horizontal mover comprises:
a second body having a given length in a direction vertical to the first body, the second body being slidably coupled to the first guide bars to move along the first guide bars by the first driver;
second guide bars having given lengths along the second body to guide the horizontal movements of the at least one parts box; and
a second driver configured to move the grasper along the second guide bars.

5. The parts feeding apparatus according to claim 4, wherein the grasper comprises:
a third body having a given length in a direction vertical to the second body, the third body being slidably coupled to the second guide bars to move along the second guide bars by the second driver;
third guide bars having given lengths along the third body to guide the forward or backward movement of the parts box; and
a gripper configured to move forward or backward along the third guide bars toward the parts feeder or the parts storage while grasping the one of the at least one parts box to load or unload the one of the at least one parts box onto or from the parts feeder or the parts storage.

6. The parts feeding apparatus according to claim 5, wherein the position mover further comprises a camera configured to capture an image of an interior of the one of the at least one parts box grasped by the gripper, the gripper further comprising a weight sensor for measuring a weight of the one of the at least one parts box grasped,
wherein the controller is configured to identify types of parts disposed in the one of the at least one parts box grasped using the captured image by the camera and to calculate a number of parts disposed in the one of the at least one parts box grasped based on unit weights of the types of parts identified in the captured image and the weight of the one of the at least one parts box measured by the weight sensor.

7. The parts feeding apparatus according to claim 6, wherein if the number of parts calculated is smaller than the number of parts required for the work, the controller is configured to instruct the position mover to load the one of the at least one parts box that is grasped onto an empty slot of the parts storage and to load another of the at least one parts box having same types of parts required for the work to the parts feeder.

8. The parts feeding apparatus according to claim 7,
wherein the parts storage further comprises output devices configured to output the number of parts remaining included in the at least one parts box,
wherein the controller is configured to control the position mover to unload the at least one parts box with which the work has been completed from the parts feeder and then load the at least one parts box with which the work has been completed onto the parts storage,
wherein the controller is configured to calculate the number of parts remaining in the at least one parts box with which the work has been completed and simultaneously output the number of parts calculated as well as identification information the types of parts to the output devices.

\* \* \* \* \*